United States Patent [19]
Champion et al.

[11] Patent Number: 5,252,306
[45] Date of Patent: Oct. 12, 1993

[54] SEMI-CONTINUOUS PROCESS FOR PREPARING PHOSPHORUS TRICHLORIDE

[75] Inventors: James L. Champion, Waterloo, Ill.; Chung Y. Shen, St. Louis; Chen-Hsyong Yang, Chesterfield, both of Mo.

[73] Assignee: Monsanto Company, St. Louis, Mo.

[21] Appl. No.: 844,071

[22] Filed: Mar. 2, 1992

[51] Int. Cl.$^5$ ............................................. C01B 25/10
[52] U.S. Cl. ................................................... 423/300
[58] Field of Search ......................................... 423/300

[56] References Cited

U.S. PATENT DOCUMENTS 4,319,894  3/1982  Kempner et al. ..................... 423/300

FOREIGN PATENT DOCUMENTS 147533     4/1981   Fed. Rep. of Germany ...... 423/300
5416957    6/1979   Japan .
688525     3/1953   United Kingdom ................ 423/300
2242899   10/1991   United Kingdom ................ 423/300

OTHER PUBLICATIONS

Schumann, Rudolph; Rapid Method for Determining Elemental Phosphorus Trichloride; Chem. Tech. (Leipzig) vol. 24, No. 6, p. 363 (1972).
Kirievskaya et al., Gas-Chromatographic Determination of White Phosphorus and of certain Phosphorus Chloride; Zhurnal Prickladnoi Khimmi, vol. 45, No. 9, pp. 2074–2076, (Sept., 1972).
Gantner et al., Applications of Laser Raman Spectrometry in Process Control Central Using Optical Fibers; Fresenius J. anal Chem. vol. 338 pp. 2–8 (1990).
Keeler, R. A. et al.; Analysis of Mixtures of White Phosphorus, Phosphorus Oxychloride and Phosphorus Trichloride; Anal Chem. vol. 26, No. 5, pp. 933–934 (1954).

Primary Examiner—Wayne Langel
Attorney, Agent, or Firm—R. C. Loyer

[57] ABSTRACT

There is disclosed an improved process for the semi-continuous production of phosphorus trichloride by the reaction of elemental phosphorus and chlorine in a liquid phosphorus trichloride layer. In accordance with the present invention periodic termination of the process by discontinuing phosphorus feed thereby creating a heel containing residual phosphorus is rendered more safe and less waste is produced by the improvement which comprises chlorinating the residual phosphorus at a substantially constant flow rate and continuing the chlorine feed rate until after observing at least one of either a step-wise decrease in the pressure within the reactor or a step-wise decrease in the flow rate of phosphorus trichloride removed from the reactor and then terminating the chlorine feed when said pressure and flow rate achieve a substantially steady state at a lower value.

4 Claims, 2 Drawing Sheets

PROCESS VARIABLE TRENDS

SEMI-CONTINUOUS PROCESS FOR PREPARING PHOSPHORUS TRICHLORIDE

This invention relates to a process for producing phosphorus trichloride by the reaction of elemental phosphorus with elemental chlorine in a liquid layer of phosphorus trichloride within a reactor. More particularly, this invention relates to a process for terminating such a reaction in a safe and efficient manner.

BACKGROUND OF THE INVENTION

In the production of phosphorus trichloride raw material impurities accumulate in the chlorination reactor and it is necessary to periodically remove such impurities by terminating the reaction and flushing out the reactor with water. The reaction, as generally carried out, involves the introduction of elemental phosphorus into a reactor which contains phosphorus trichloride. A separate liquid layer of elemental phosphorus may be established below the phosphorus trichloride. Chlorine gas is introduced into the phosphorus trichloride by means of spargers which agitate the contents of the reactor and assist in dissolving phosphorus in the liquid layer. The dissolved phosphorus in the phosphorus trichloride layer reacts with the chlorine producing phosphorus trichloride. Because the reaction is exothermic phosphorous trichloride is caused to vaporize and to be taken out of the reactor overhead where it is condensed and purified. It has been found that raw material impurities (mostly from elemental phosphorus) accumulate in the chlorination reactor and must be periodically removed.

The procedure for periodic removal of impurities from the reactor comprises first terminating the introduction of phosphorus into the reactor. The residual phosphorus is then consumed by reaction with chlorine. The next important decision to be made in terminating the reaction is when to terminate the chlorine feed to the reactor. If the chlorine feed is terminated too early small amounts of elemental phosphorus may remain in the reactor and cause a dangerous situation when the reactor is opened for cleaning. If the chlorination continues for a period of time subsequent to the consumption of all of the elemental phosphorus in the reactor excessive amounts of phosphorus pentachloride are produced thereby creating a waste disposal problem.

One of the common impurities in phosphorus is water which is used to protect phosphorus from contact with air to cause spontaneous combustion. Water will react with phosphorus trichloride to form phosphorus acid, phosphoric acid and many undefined lower oxides mixtures. These lower oxides must be chlorinated to form either volatile chlorides or oxidized to stable phosphoric acid. To determine the end point of chlorination of the lower oxides is difficult and is largely unknown.

In the past various means have been taken to determine when the chlorine feed to the reactor should be terminated. Rapid, periodic analysis of samples from the reactor indicating the amount of phosphorus in the reactor has been found to be dangerous, cumbersome and unreliable. One such method is disclosed in *Chem. Tech (Leipzig)* Vol. 24, No. 6, page 363 (1972) by Rudolph Schumann. In this method a measured sample of the phosphorus trichloride solution is withdrawn from the reactor and poured into a Dewar flask containing bromine dissolved in carbon tetrachloride. The temperature of the solution before addition of the sample is noted and after thorough mixing the temperature is again noted. The temperature difference is a rough measure of the phosphorus concentration as determined by comparison with a calibration curve.

Another method of analysis for phosphorus and phosphorus chlorides is gas chromatography. Such a method is reported by N. M. Kirievskaya et al in a publication entitled "*Gas-Chromatographic Determination of White Phosphorus and of Certain Phosphorus Chlorides*" appearing in *Zhurnal's Prikladnoi Khimii*, Vol. 45, No. 9, pages 2074–2076, (1972). A chromatograph was employed to determine white phosphorus and various phosphorus chlorides with a 5,000×3 mn column packed with Celite 545 and SKT-FT-100×methylfluoropropylsilicone rubber. The column temperature was 150° C. and a thermal conductivity detector was used. The method was based upon mixtures of reagent grade materials mixed together in the laboratory.

Various measurements of reactor conditions have been employed to aid in the determination of heel chlorination end point. An example is provided by Japanese Patent Publication 54-16957 to Zinno et al wherein the temperature of the cooling solvent employed to control the temperature of the reactor was used to determine the completion of the reaction of yellow phosphorus with chlorine within the reactor. According to this publication the reaction of yellow phosphorus and chlorine was controlled to a temperature within 1° C. of a specified temperature. After the supply of yellow phosphorus to the reactor is terminated the chlorine feed is continually supplied to the reactor until the temperature at the exit of the cooling solvent condenser, or the reaction tower top or the reactor interior decreases 2° C. below the reaction temperature. The temperature drop was considered an indication of the termination of the exothermic reaction of yellow phosphorus and chlorine.

Even when, by the various means available, it was believed that all of the phosphorus in the reactor was consumed it has been found that reactive chemicals remained in the reactor which created safety hazards upon opening the reactor for cleaning. A more detailed study of the chemistry of the reaction was needed to determine the source of reactive chemicals remaining in the reactor even after all of the elemental phosphorus was consumed. There was therefore needed a more specific and more consistent means for determining the end point of heel chlorination to provide a safe, efficient and ecologically more acceptable means for operating the process for preparing phosphorus trichloride.

SUMMARY OF THE INVENTION

As a result of a detailed study of the reaction chemistry within the phosphorus trichloride reactor there has now been discovered a process for the semicontinuous production of phosphorus trichloride by feeding and dissolving elemental phosphorus into a layer of phosphorus trichloride in a reactor while feeding chlorine gas into said liquid layer under pressure and at elevated temperature whereby phosphorus trichloride vapor produced is removed overhead and wherein the reactor is periodically terminated by discontinuing phosphorus feed thereby creating a heel containing residual phosphorus. The improvement, in accordance with this invention, comprises continuing the chlorine feed rate at a substantially constant flow rate whereby the remaining phosphorus in the heel is chlorinated, and continuing said chlorine feed rate until after observing at least one of the following:
   a. a step-wise decrease in the pressure within the reactor; or
   b. a step-wise decrease in the flow rate of phosphorus trichloride removed from said reactor and then terminating the chlorine feed when the pressure within the reactor or the flow rate of phosphorus trichloride achieve a substantially steady state at a lower level.

It has been determined that after completing the chlorination of all of the phosphorus remaining in the heel within the reactor continued chlorination is necessary to chlorinate the lower oxides of phosphorus which accumulate in the reactor and are not removed through normal operation. The lower oxides of phosphorus may produce phosphine or diphosphine during heel residue hydrolysis resulting in fire incidents if not controlled properly.

In accordance with the present invention, the residual phosphorus in the heel as well as the lower oxides of phosphorus are chlorinated and the chlorination is terminated before excessive amounts of phosphorus pentachloride are generated thereby eliminating, reactive materials without producing excessive amounts of undesired waste product.

DETAILED DESCRIPTION OF THE INVENTION

Figure 1:
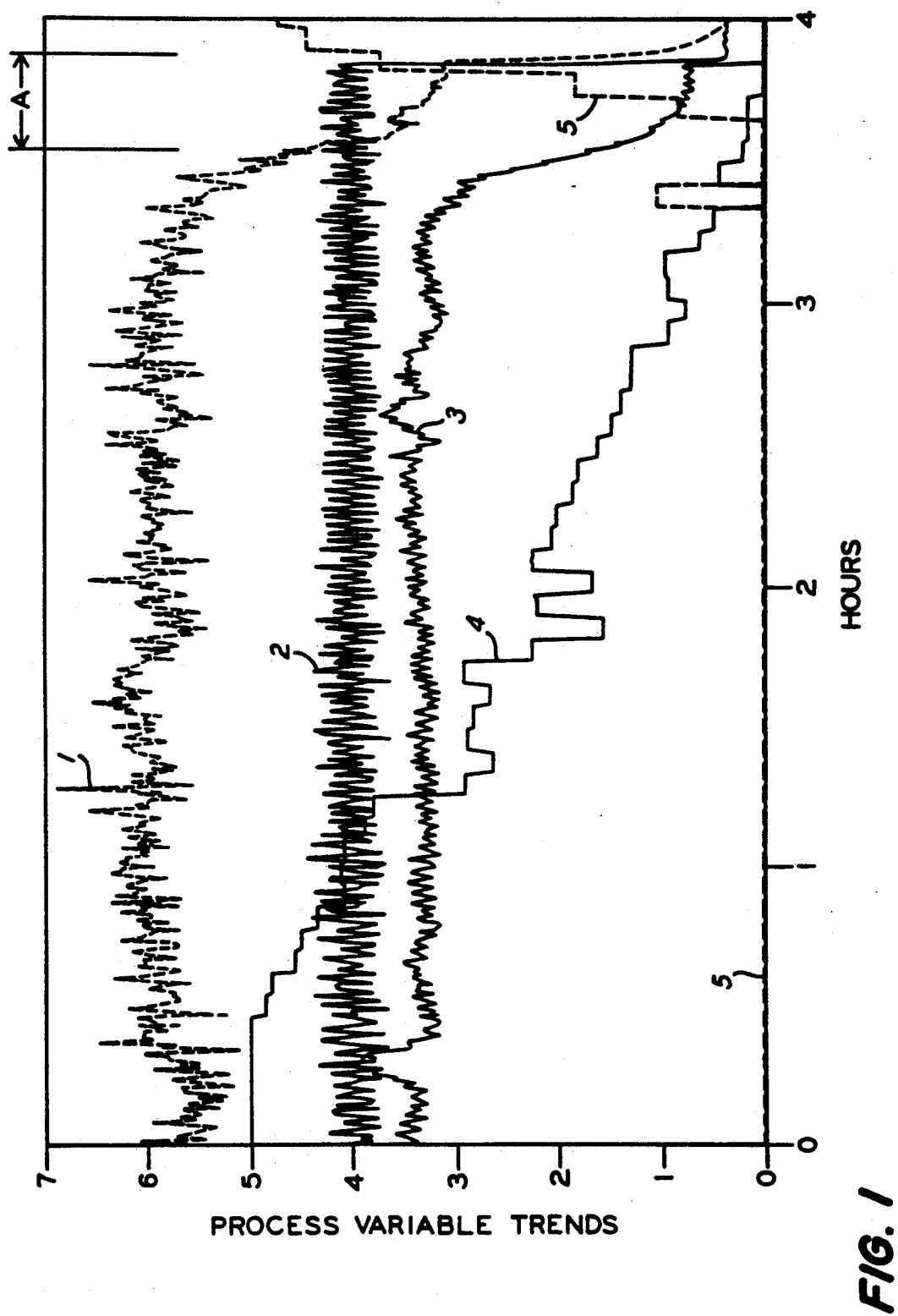
FIG. 1 is a graphical representation of data taken from a phosphorus trichloride reactor at the terminal portion of the reaction wherein the chlorine feed rate, phosphorus content, internal reactor pressure and flow rate of phosphorus trichloride removed from the reactor are measured.

In accordance with this invention a reactor of typical design for preparing phosphorus trichloride by the reaction of liquid elemental phosphorus with chlorine is employed. However, such reactor must be equipped with an accurate and responsive means to determine the pressure within the reactor. Preferably the pressure indicating device has a recorder such that a continuous record of the internal pressure within the reactor is displayed. Also, the reactor employed to practice the process of this invention is equipped with means to withdraw phosphorus trichloride overhead and to condense the vapors. The condenser is equipped with a means to measure the flow rate of phosphorus trichloride leaving the reactor. The device employed to determine the flow rate of phosphorus trichloride leaving the reactor is preferably one which continuously records on a chart the flow rate such that the flow rate is easily discerned and any changes in the rate of flow are readily apparent. While not essential, it is preferred that the amount of phosphorus, particularly in the liquid phosphorus trichloride layer within the reactor be determined at frequent intervals. Preferably the amount of phosphorus in the reactor is determined on a continuous basis such as by means of a remotely located laser Raman spectrometer which is attached to a circulatory sampling system conveying, on a continuous basis, sample material from the reactor and returning it to the reactor after analysis. Such a process is described in copending application Ser. No. 807,353 filed Dec. 16, 1991.

In prior studies of the chemistry involved with heel chlorination in the process of this invention it was thought to be confined to two steps, that is, the chlorination of elemental phosphorus and the subsequent chlorination of phosphorus trichloride and lower oxides. Incomplete chlorination would occur when process instrumentation did not indicate accurately the amount of elemental phosphorus or the thermal reaction trends could not be identified. This resulted in the chlorine feed amount falling short of the required minimum amount to provide safe opening of the reactor when the chlorine feed was terminated. In one aspect of this invention it has been discovered that lower oxides of phosphorus are accumulated in the phosphorus trichloride reactor which are generated from the reaction of water and phosphorus trichloride. However, the exact nature of the lower oxides of phosphorus in the reactor have not been characterized. It is known that one precursor of the lower oxides of phosphorus in the reactor is pyrophosphorous acid.

The consequence of incomplete chlorination of the reactor heel often resulted in incidents of fire and subsequent environmental concerns associated with elemental phosphorus disposal. On the other hand, heel chlorination beyond the proper end point results in the formation of large amounts of phosphorus pentachloride which under these circumstances becomes a waste material. It has now been discovered in accordance with this invention that heel chlorination end point determination techniques are reliable and reproducible because the present method takes into account chlorination of the lower oxides of phosphorus in addition to the complete chlorination of the elemental phosphorus.

It has been observed in accordance with this invention that the amount of pressure in the reactor decreases step-wise and reaches a substantially steady state at a lower value upon completion of the chlorination of the elemental phosphorus and the lower oxides of phosphorus. Likewise, a step-wise decrease in the flow rate of phosphorus trichloride removed from the reactor and condensed occurs when all of the phosphorus as well as the lower oxides of phosphorus are completely chlorinated. When the flow rate of phosphorus trichloride condensate achieves a substantially steady state at the lower rate it has been determined that the heel chlorination end point has been reached. Those skilled in the art gaining a minimum amount of experience with the process of this invention can easily identify the step-wise reduction in pressure or flow rate of condensed phosphorus trichloride. These measured conditions achieve a substantially steady state at a lower value indicating that the chlorination should be quickly terminated thereby avoiding a large excess of unwanted phosphorus pentachloride.

To illustrate the process of this invention there is provided the attached drawings wherein, in FIG. 1, there is shown in graphical form the measurement of the amount of phosphorus, the amount of phosphorus pentachloride, the pressure, the chlorine feed rate and the flow rate of phosphorus trichloride removed from the reactor. The flow rate of phosphorus trichloride may be either in the vapor or condensed form. The data provided in FIG. 1 is produced by a typical reactor wherein liquid phosphorus is fed to the reactor into a layer of liquid phosphorus trichloride. Chlorine gas is sparged into the liquid layer of phosphorus trichloride at a substantially constant rate and phosphorus trichloride is removed overhead and condensed providing a flow rate also indicated in FIG. 1. Because each of the measured parameters shown in FIG. 1 are on a different scale, there is listed below the factors which are multipliers of the values indicated on the Y axis for each line and the units of measure for each value.

| Line | Factor | Unit |
|------|--------|------|
| 1 | 10,000 | lbs./hr. |
| 2 | 1,000 | lbs/hr. |
| 3 | 10 | in. water |
| 4 | 2 | wt. % |
| 5 | 2 | wt. % |

In FIG. 1, line 1, indicates the flow rate of condensed phosphorus trichloride removed from the phosphorus trichloride reactor. Line 2 indicates the feed rate of the chlorine gas sparged into the phosphorus trichloride layer in the reactor. Line 3 indicates the pressure measured within the reactor while line 4 indicates the analysis of the reactor content indicating the amount of phosphorus remaining in the reactor. Line 5 indicates the amount of phosphorus pentachloride in the reactor. The purpose of FIG. 1 is to graphically indicate the change in reactor conditions rather than any particular values assigned to the various curves. Also, the data is FIG. 1 covers the termination of the reaction in heel chlorination over a period of about 4 hours.

Figure 2:
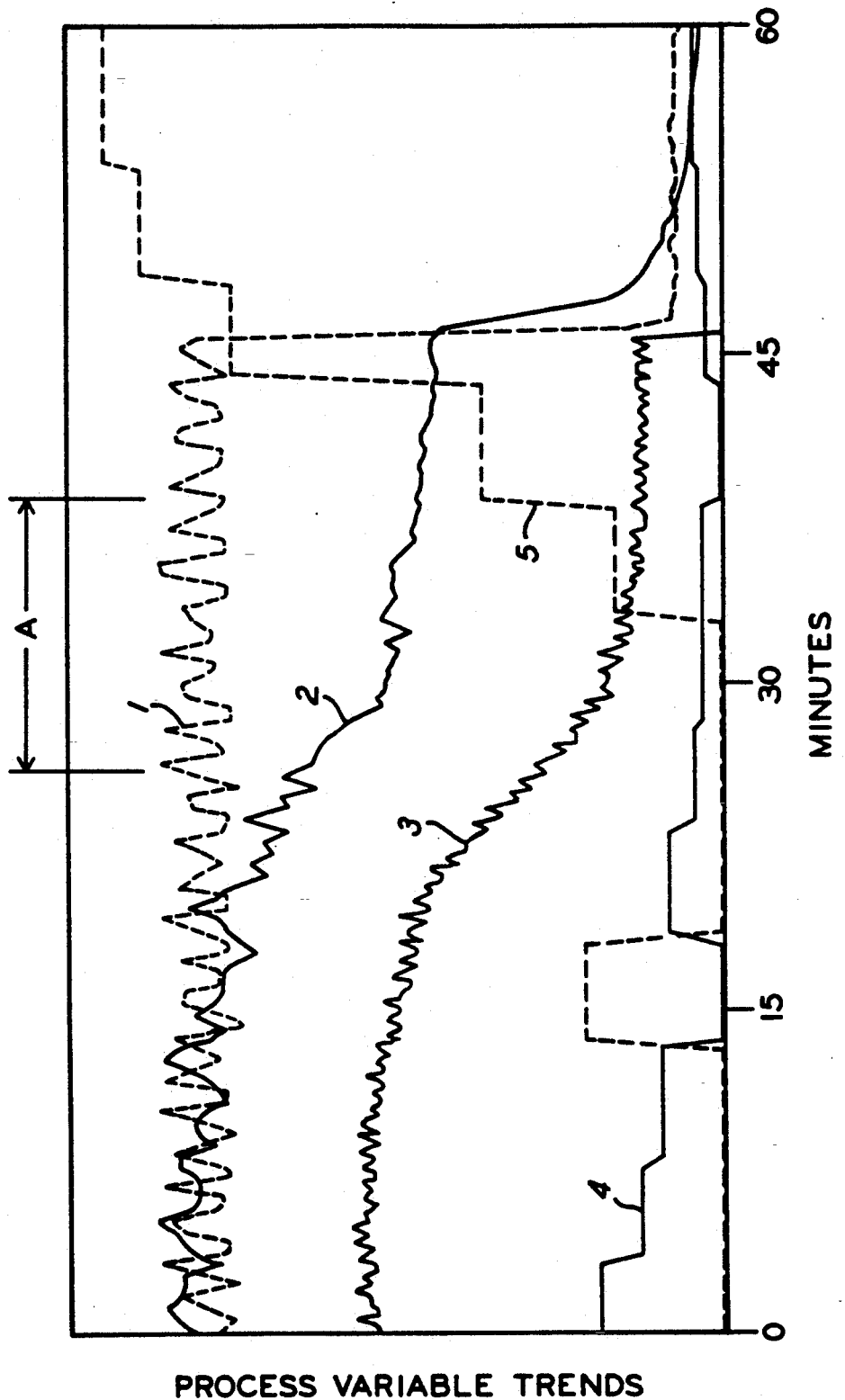
In FIG. 2 is shown a graphical representation of a segment of a reaction sequence of FIG. 1 for producing phosphorus trichloride in larger scale wherein the heel chlorination procedure of this invention is carried out.

To more particularly illustrate the process of this invention, there is provided in FIG. 2 the same data as in FIG. 1 but in much larger scale. Lines 1–5 have the same meaning as in FIG. 1. However, the length of time covered by the data in FIG. 2 is approximately one hour, said hour being the last hour of operation of heel chlorination prior to shut down of the reactor as indicated by the termination of the chlorine feed rate. It can be clearly seen in FIG. 2 that the chlorine feed rate was maintained constant until shutdown. The flow rate of condensed phosphorus trichloride removed from the reactor (line 1) shows a step-wise reduction at point A in the graph. Subsequent to the step-wise reduction in flow rate it is seen that substantially steady state flow rate was shown. Also shown in FIG. 2 is the step-wise reduction at point A of the pressure within the reactor; thereafter the pressure is seen to maintain a substantially steady state condition. The amount of phosphorus pentachloride as shown in line 5 of FIG. 2 increases rapidly during the period of steady state flow rate of phosphorus trichloride and internal pressure within the reactor. From FIG. 2 it is easily seen that termination of chlorination only minutes prior to that illustrated by FIG. 2 would reduce drastically the amount of phosphorus pentachloride waste material found in the reactor at termination.

The process for preparing phosphorus trichloride can be operated as is typically taught in the prior art until heel chlorination and end point determination is reached. Therefore, feed rates of phosphorus and chlorine are the same as in prior art processes as well as temperatures and pressures within the reactor. It is only in determining the end point that the process of this invention varies from the prior art.

There has been described a novel process of general application for the production of phosphorus trichloride. Various modifications may be made which are adapted to suit the various reactants and products without departing from this invention.

What is claimed is:

1. In a process for the semi-continuous production of phosphorus trichloride by feeding and dissolving elemental phosphorus into a layer of liquid phosphorus trichloride in a reactor while feeding chlorine gas into said layer under pressure and at elevated temperature whereby phosphorus trichloride vapor produced is removed overhead and wherein the reaction is periodically terminated by discontinuing phosphorus feed thereby creating a heel containing residual phosphorus, the improvement which comprises chlorinating at a substantially constant feed rate of chlorine gas whereby the remaining phosphorus and lower oxides of phosphorus in the heel are chlorinated, and continuing said chlorine feed rate until after observing at least one of the following:

a) a step-wise decrease in the pressure within the reactor; or
   b) a step-wise decrease in the flow rate of phosphorus trichloride removed from said reactor; and then terminating the chlorine feed when at least one of the pressure within the reactor or the flow rate of phosphorus trichloride removed from the reactor achieves a substantially steady state.

2. The process of claim 1 wherein the chlorine feed is terminated after a step-wise decrease in the pressure within the reactor is observed.

3. The process of claim 1 wherein the chlorine feed is terminated after a step-wise decrease in the flow rate of phosphorus trichloride removed from the reactor is observed.

4. The process of claim 1 wherein the chlorine feed is terminated after a step-wise decrease in both the pressure within the reactor and a step-wise decrease in the flow rate of phosphorus trichloride removed from said reactor are observed.

* * * * *